United States Patent
Chin et al.

(10) Patent No.: US 8,743,826 B2
(45) Date of Patent: Jun. 3, 2014

(54) METHODS AND APPARATUS FOR SCANNING FOR NEIGHBOR BASE STATIONS IN TIME SYNCHRONOUS WIRELESS COMMUNICATION SYSTEMS

(75) Inventors: Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 616 days.

(21) Appl. No.: 12/246,474

(22) Filed: Oct. 6, 2008

(65) Prior Publication Data

US 2010/0085941 A1    Apr. 8, 2010

(51) Int. Cl.
*H04W 4/00*    (2009.01)

(52) U.S. Cl.
USPC .......................................... 370/331; 455/434

(58) Field of Classification Search
None
See application file for complete search history.

(56) References Cited

U.S. PATENT DOCUMENTS

| | | | |
|---|---|---|---|
| 5,867,478 A | 2/1999 | Baum et al. | |
| 7,336,953 B2 | 2/2008 | Kim et al. | |
| 2006/0003767 A1* | 1/2006 | Kim et al. | 455/436 |
| 2006/0229075 A1* | 10/2006 | Kim et al. | 370/331 |
| 2007/0105558 A1* | 5/2007 | Suh et al. | 370/331 |
| 2007/0123254 A1 | 5/2007 | Choi et al. | |
| 2007/0287462 A1 | 12/2007 | Gorokhov et al. | |
| 2008/0232513 A1 | 9/2008 | Wang et al. | |
| 2008/0279322 A1* | 11/2008 | Franovici et al. | 375/371 |
| 2008/0310341 A1 | 12/2008 | Koyanagi | |
| 2009/0080406 A1* | 3/2009 | Gopal et al. | 370/350 |
| 2009/0168745 A1* | 7/2009 | Ahmadi et al. | 370/350 |
| 2010/0003986 A1* | 1/2010 | Chen | 455/436 |

FOREIGN PATENT DOCUMENTS

| | | |
|---|---|---|
| CN | 1994011 A | 7/2007 |
| CN | 101272369 A | 9/2008 |
| EP | 1953982 A1 | 8/2008 |
| JP | 2008236744 A | 10/2008 |
| KR | 20070026867 A | 3/2007 |
| KR | 20070050578 A | 5/2007 |

OTHER PUBLICATIONS

International Search Report and Written Opinion—PCT/US2009/058870—ISA EPO—Dec. 3, 2009.
Taiwan Search Report—TW098133875—TIPO—Jan. 2, 2013.

* cited by examiner

*Primary Examiner* — Anh-Vu Ly
(74) *Attorney, Agent, or Firm* — Tyler J. Overall (57) ABSTRACT

A method for scanning for neighbor base stations in a time synchronous wireless communication system may be implemented by a mobile station. The method may include detecting a serving base station preamble index that is transmitted by a serving base station in a subcarrier subset during a frame. The method may also include using the detected serving base station preamble index to determine a signal quality measurement for the serving base station. The method may also include detecting at least one neighbor base station preamble index that is transmitted by a neighbor base station in another subcarrier subset transmitted during the same frame. The method may further include using the detected neighbor base station preamble index to determine a signal quality measurement for the neighbor base station.

32 Claims, 8 Drawing Sheets

METHODS AND APPARATUS FOR SCANNING FOR NEIGHBOR BASE STATIONS IN TIME SYNCHRONOUS WIRELESS COMMUNICATION SYSTEMS

TECHNICAL FIELD

The present disclosure relates generally to communication systems. More specifically, the present disclosure relates to methods and apparatus for scanning for neighbor base stations in time synchronous wireless communication systems.

BACKGROUND

As used herein, the term "mobile station" refers to an electronic device that may be used for voice and/or data communication over a wireless communication system. Examples of mobile stations include cellular phones, personal digital assistants (PDAs), handheld devices, wireless modems, laptop computers, personal computers, etc. A mobile station may alternatively be referred to as an access terminal, a mobile terminal, a subscriber station, a remote station, a user terminal, a terminal, a subscriber unit, user equipment, etc.

A wireless communication system may provide communication for a number of mobile stations, each of which may be serviced by a base station. A base station may alternatively be referred to as an access point, a Node B, or some other terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station.

The resources of a wireless communication system (e.g., bandwidth and transmit power) may be shared among multiple mobile stations. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Benefits may be realized by improved methods and apparatus related to the operation of wireless communication systems.

SUMMARY

A method for scanning for neighbor base stations in a time synchronous wireless communication system is disclosed. The method may be implemented by a mobile station. The method may include detecting a serving base station preamble index that is transmitted by a serving base station in a subcarrier subset during a frame. The method may also include using the detected serving base station preamble index to determine a signal quality measurement for the serving base station. The method may also include detecting at least one neighbor base station preamble index that is transmitted by a neighbor base station in another subcarrier subset transmitted during the same frame. The method may further include using the detected neighbor base station preamble index to determine a signal quality measurement for the neighbor base station.

A mobile station configured for scanning for neighbor base stations in a time synchronous wireless communication system is disclosed. The mobile station may include a processor and memory in electronic communication with the processor. Instructions may be stored in the memory. The instructions may be executable to detect a serving base station preamble index that is transmitted by a serving base station in a subcarrier subset during a frame. The instructions may also be executable to use the detected serving base station preamble index to determine a signal quality measurement for the serving base station. The instructions may also be executable to detect at least one neighbor base station preamble index that is transmitted by a neighbor base station in another subcarrier subset transmitted during the same frame. The instructions may also be executable to use the detected neighbor base station preamble index to determine a signal quality measurement for the neighbor base station.

A mobile station configured for scanning for neighbor base stations in a time synchronous wireless communication system is disclosed. The mobile station may include means for detecting a serving base station preamble index that is transmitted by a serving base station in a subcarrier subset during a frame. The mobile station may also include means for using the detected serving base station preamble index to determine a signal quality measurement for the serving base station. The mobile station may also include means for detecting at least one neighbor base station preamble index that is transmitted by a neighbor base station in another subcarrier subset transmitted during the same frame. The mobile station may also include means for using the detected neighbor base station preamble index to determine a signal quality measurement for the neighbor base station.

A computer-program product for scanning for neighbor base stations in a time synchronous wireless communication system by a mobile station is disclosed. The computer-program product may include a computer-readable medium having instructions thereon. The instructions may include code for detecting a serving base station preamble index that is transmitted by a serving base station in a subcarrier subset during a frame. The instructions may also include code for using the detected serving base station preamble index to determine a signal quality measurement for the serving base station. The instructions may also include code for detecting at least one neighbor base station preamble index that is transmitted by a neighbor base station in another subcarrier subset transmitted during the same frame. The instructions may also include code for using the detected neighbor base station preamble index to determine a signal quality measurement for the neighbor base station.

In certain embodiments, the summaries above may be configured and/or used such that time synchronous wireless communication system supports an Institute of Electronic and Electrical Engineers (IEEE) 802.16 standard.

DETAILED DESCRIPTION

The techniques disclosed herein may be implemented in WiMAX systems. The term "WiMAX" refers to a family of standards that is prepared by the Institute of Electronic and Electrical Engineers (IEEE) 802.16 Working Group on Broadband Wireless Access Standards. Thus, the term "WiMAX system" refers to a wireless communication system that is configured in accordance with one or more WiMAX standards.

When a mobile station is in a traffic state and has set up a traffic connection, the mobile station regularly monitors the signal strength, such as the Received Signal Strength Indication (RSSI) or Carrier-to-Interference-plus-Noise Ratio (CINR), of the neighbor base stations. Each base station may periodically transmit a unique preamble index. By correlating the preamble index that is received from a particular base station with the preamble index that was transmitted by the base station (which is known to the mobile station), the mobile station can determine the strength of the signal transmitted by the base station.

In WiMAX systems, in order to improve performance in handover, different base stations have synchronous frame timing. That is, different base stations transmit downlink frames at nearly the same time.

In order to receive the preamble indices that are transmitted by neighbor base stations, a mobile station may request a special scanning duration with its current serving base station so that the mobile station can temporarily suspend its traffic data transmission before scanning for neighbor base station preamble indices. However, this may cause the mobile station to lose throughput because the mobile station is not able to transmit or receive regular data while it is scanning for neighbor base station preamble indices in this manner.

The present disclosure relates to improved techniques for scanning for neighbor base station preamble indices in time synchronous wireless communication systems, such as WiMAX systems. In accordance with the techniques disclosed herein, a mobile station may not have to request a special scanning duration with the current serving base station in order to scan for at least some neighbor base station preamble indices and measure the signal strength of these preamble indices.

Figure 1:
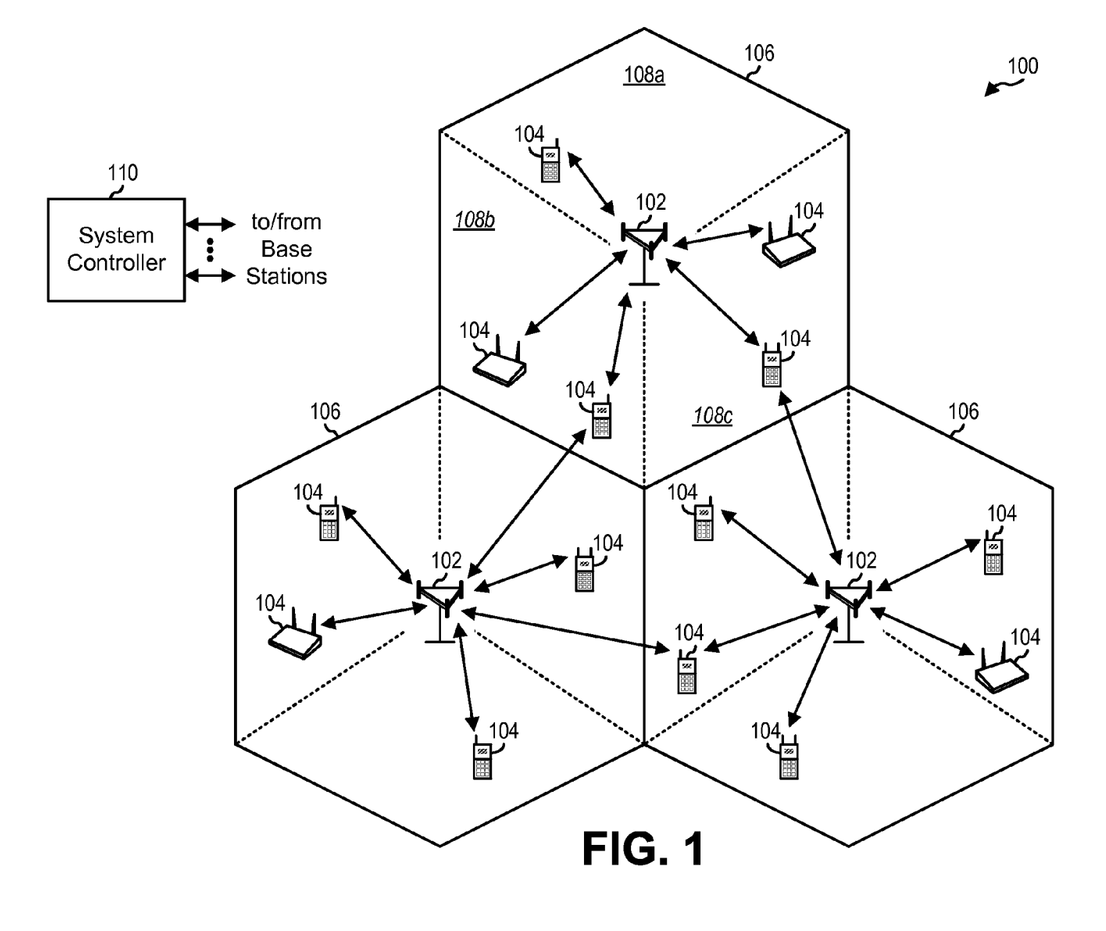
FIG. 1 illustrates a wireless communication system with multiple base stations and multiple mobile stations.

FIG. 1 shows a wireless communication system 100 with multiple base stations (BS) 102 and multiple mobile stations (MS) 104. A base station 102 is a station that communicates with the mobile stations 104. A base station 102 may also be called, and may contain some or all of the functionality of, an access point, a Node B, an evolved Node B, etc. Each base station 102 provides communication coverage for a particular geographic area 106. The term "cell" can refer to a base station 102 and/or its coverage area 106 depending on the context in which the term is used. To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Mobile stations 104 are typically dispersed throughout the system 100. A mobile station 104 may also be called, and may contain some or all of the functionality of, a terminal, an access terminal, a user equipment, a subscriber unit, a station, etc. A mobile station 104 may be a cellular phone, a personal digital assistant (PDA), a wireless device, a wireless modem, a handheld device, a laptop computer, etc. A mobile station 104 may communicate with zero, one, or multiple base stations 104 on the downlink (DL) and/or uplink (UL) at any given moment. The downlink (or forward link) refers to the communication link from the base stations 102 to the mobile stations 104, and the uplink (or reverse link) refers to the communication link from the mobile stations 104 to the base stations 102.

For a centralized architecture, a system controller 110 may couple to base stations 102 and provide coordination and control for these base stations 102. The system controller 110 may be a single network entity or a collection of network entities. For a distributed architecture, base stations 102 may communicate with one another as needed.

As indicated above, the techniques disclosed herein may be implemented in WiMAX systems. WiMAX is based on orthogonal frequency division multiplexing (OFDM) and orthogonal frequency division multiple access (OFDMA) technology. OFDM is a digital multi-carrier modulation technique that has recently found wide adoption in a variety of high-data-rate communication networks. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

Figure 2:
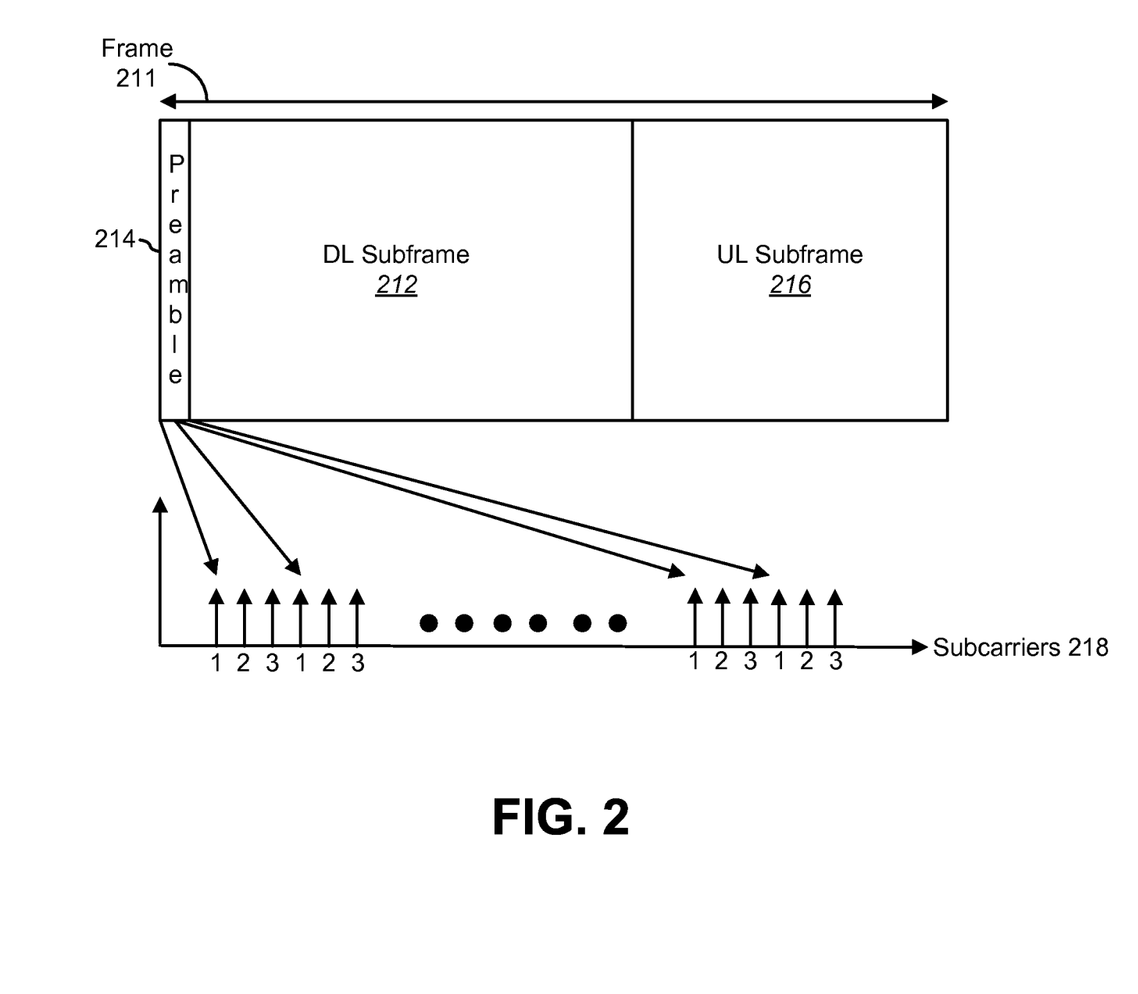
FIG. 2 illustrates the frame structure for a WiMAX system.

FIG. 2 illustrates the frame structure for a WiMAX system. A WiMAX frame 211 is partitioned into a downlink subframe 212 and an uplink subframe 216. Downlink transmissions (i.e., transmissions from base stations 102 to mobile stations 104) occur during the downlink subframe 212. Uplink transmissions (i.e., transmissions from mobile stations 104 to base stations 102) occur during the uplink subframe 216. The first OFDMA symbol of the downlink subframe 212 is utilized for transmitting a preamble index 214. The preamble index 214 may be referred to simply as a preamble 214. Each base station 102 transmits a unique preamble index 214, which may be known in advance by the mobile stations 104. The preamble index 214 may be used for physical-layer procedures, such as time and frequency synchronization and initial channel estimation.

As indicated above, WiMAX utilizes OFDMA, which is a multiple access technique in which users are assigned subcarriers 218 in different time slots. WiMAX standards specify that one base station 102 will use only one-third of the available subcarriers 218 of the first OFDMA symbol of the downlink subframe 212 for transmitting its preamble index 214. This one-third of the subcarriers 218 will be referred to herein as a "subcarrier subset." Therefore, there are three subcarrier subsets, which are labeled "1," "2" and "3" in FIG. 2. The subcarriers 218 labeled "1" belong to the first subcarrier subset, the subcarriers 218 labeled "2" belong to the second subcarrier subset, and the subcarriers 218 labeled "3" belong to the third subcarrier subset. One base station 102 transmits its preamble index 214 on one of the subcarrier subsets (e.g., the first subcarrier subset, as shown).

In a time synchronized system, some neighbor base stations 102 may transmit their preamble indices 214 on the same subcarrier subset, while some neighbor base stations 102 may transmit their preamble indices 214 on different subcarrier subsets. Therefore, a mobile station 104 can detect some preamble indices 214 to measure the signal strength of some neighbor base stations 102 according to the symbol timing of the current serving base station 102. Stated another way, since the serving base station 102 transmits its preamble index 214 on one of three subcarrier subsets, a mobile station 104 may still decode the remaining two-thirds of subcarriers 218 (i.e., the other two subcarrier subsets) for scanning neighbor base station preamble indices 214.

Figure 3:
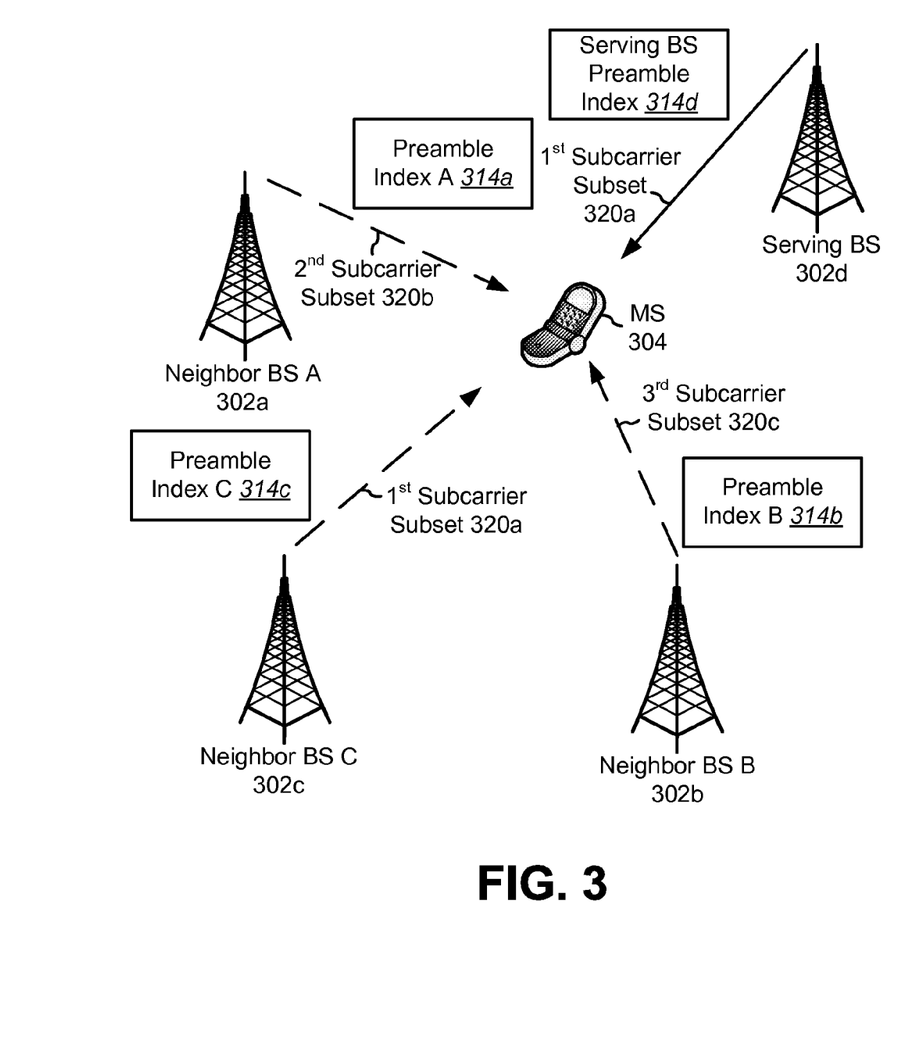
FIG. 3 illustrates a mobile station within the coverage area of multiple base stations.

FIG. 3 illustrates a mobile station 304 within the coverage area of multiple base stations 302, including a serving base station 302d and three neighbor base stations 302a-c, labeled neighbor base station A 302a, neighbor base station B 302b and neighbor base station C 302c. Each base station 302 transmits a unique preamble index 314. The preamble index 314d that is transmitted by the serving base station 302d will be referred to herein as the serving base station preamble index 314d. The preamble indices 314a-c that are transmitted by the neighbor base stations 302a-c will be referred to as preamble index A 314a, preamble index B 314b and preamble index C 314c, respectively.

Each base station 302 transmits its preamble index 314 on one of the three subcarrier subsets 320. In the example that is shown in FIG. 3, the serving base station preamble index 314d may be transmitted on the first subcarrier subset 320a. Preamble index A 314a may be transmitted on the second subcarrier subset 320b. Preamble index B 314b may be transmitted on the third subcarrier subset 320c. Preamble index C 314c may be transmitted on the first subcarrier subset 320a.

Since the serving base station 302d transmits its preamble index 314d on only one of the three subcarrier subsets 320a, the mobile station 304 can still decode the other two subcarrier subsets 320b-c for scanning some neighbor base station preamble indices 314b-c. In the example that is shown in FIG. 3, in addition to detecting the serving base station preamble index 314d, the mobile station 304 may also be able to detect preamble index A 314a and preamble index B 314b without requesting a special scanning duration from the serving base station 302d.

The present disclosure proposes a receiver architecture for the mobile station 304 in which there are three branches, each to process one-third of the subcarriers 218 (i.e., one subcarrier subset 320) on the first OFDMA symbol of the downlink frame 212 for scanning for neighbor base station preamble indices 314a-c.

Figure 4:
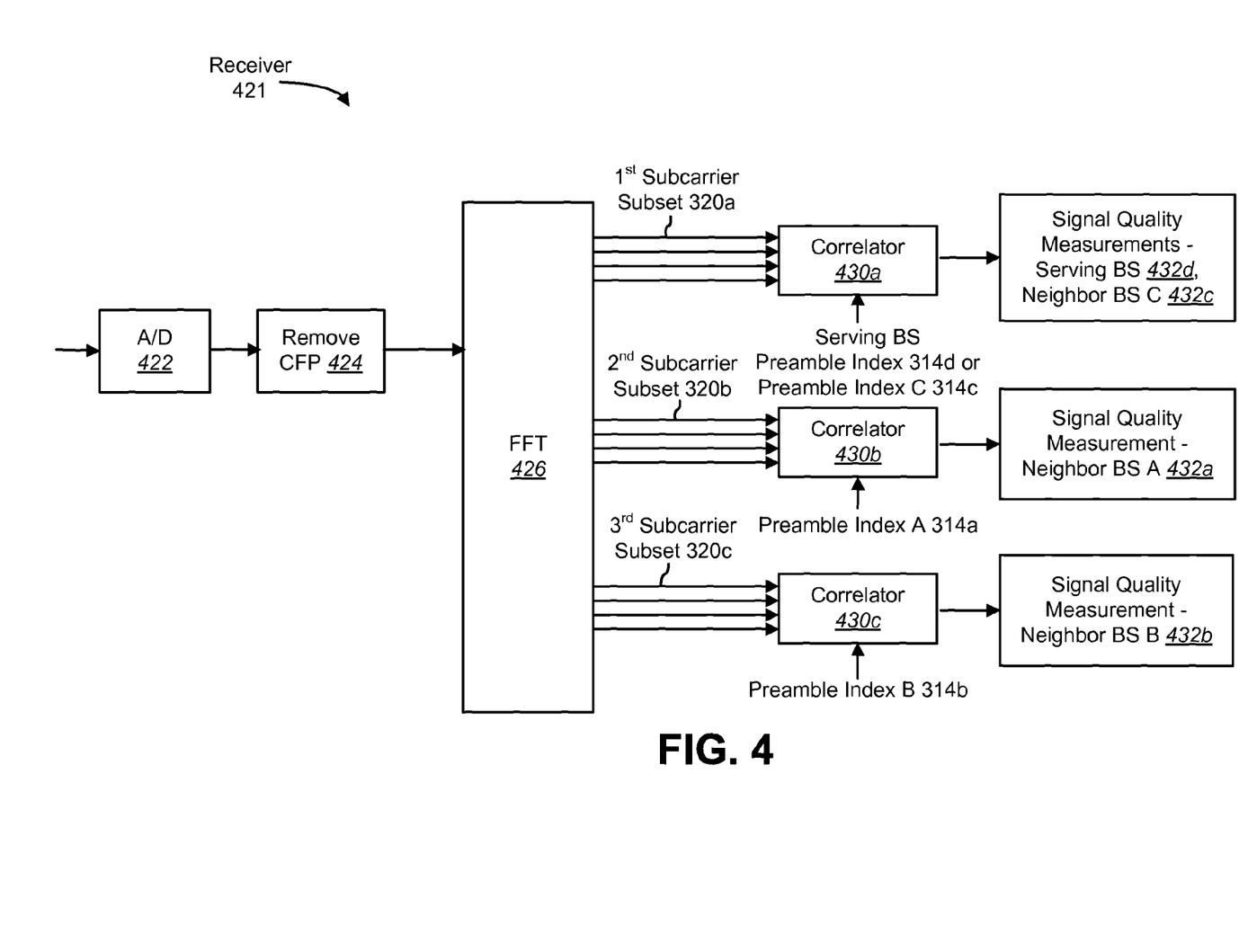
FIG. 4 illustrates an example of a receiver for a mobile station that is configured to facilitate scanning for neighbor base station preamble indices.

FIG. 4 illustrates an example of a receiver 421 for a mobile station 304 that is configured to facilitate scanning for neighbor base station preamble indices 314a-c. The receiver 421 includes an analog-to-digital converter 422, a block 424 for removing the cyclic prefix and a fast Fourier transform (FFT) block 426.

During the first OFDMA symbol of the downlink subframe 212, which is when the base stations 302 transmit their preamble indices 314, the FFT block 426 outputs the first subcarrier subset 320a, the second subcarrier subset 320b and the third subcarrier subset 320c. Each of these subcarrier subsets 320a, 320b, 320c is processed separately. In particular, each subcarrier subset 320a, 320b, 320c is provided to a correlator 430a, 430b, 430c. The receiver 421 may know what the different preamble indices 314 transmitted by the various base stations 302 are. For example, these preamble indices 314 may be included in a neighbor advertisement message that the serving base station 302d transmits to the mobile station 304.

If the transmission of preamble indices 314 occurs as shown in the example of FIG. 3, then the first subcarrier subset 320a may be correlated with the serving base station preamble index 314d and preamble index C 314c to determine a signal quality measurement 432d for the serving base station 302d and a signal quality measurement 432c for neighbor base station C 302c. The second subcarrier subset 320b may be correlated with preamble index A 314a to determine a signal quality measurement 432a for neighbor base station A 302a. The third subcarrier subset 320c may be correlated with preamble index B 314b to determine a signal quality measurement 432b for neighbor base station B 302b. If at any point the signal quality measurement 432a for neighbor base station A 302a, the signal quality measurement 432b for neighbor base station B 302b or the signal quality measurement 432c for neighbor base station C 302c exceeds the signal quality measurement 432d for the serving base station 302d, then the mobile station 304 may initiate handover.

In this example, both the serving base station preamble index 314d and preamble index C 314c are transmitted on the first subcarrier subset 320a. The receiver 421 can store the FFT block 426 output of the preamble duration, and then the correlator 430 can switch from the serving base station preamble index 314d to preamble index C 314c. This can be done right after the serving base station 302d measurement during the same frame. However, if the processing speed is not fast enough (i.e., the mobile station 304 can only measure one base station 302 per subcarrier subset 320 during one frame), then the mobile station 304 may measure the signal quality of the base stations 302c, 302d alternatively. For example, in frame k, the mobile station 304 may measure the serving base station 302d. In frame k+1, the mobile station 304 may measure neighbor base station C 302c, and the sequence may be repeated.

The present disclosure proposes the following procedures at each frame to scan for neighbor base stations 302a-c. First, the mobile station 304 may process the preamble indices 314 in the received neighbor advertisement message (i.e., MOB_NBR-ADV) as well as the serving base station's preamble index 314d.

If a particular preamble index 314 has not previously been detected in any of the subcarrier subsets 320, this preamble index 314 may be tried in any of the three subcarrier subsets 320. After a preamble index 314 is successfully detected, it may remain on this subcarrier subset 320 in the future unless a handover occurs.

When a preamble index 314 is detected, the mobile station receiver 421 may continue to measure preamble signal strength using its preamble index 314 in the correlator 430 on the known subcarrier subset 320. This also applies to the serving base station's preamble index 314d.

After all the preamble indices 314 have been processed, the mobile station 304 can know the signal strength of all detected preamble indices 314, including the serving base station preamble index 314d and some neighbor base station preamble indices 314a-c. This information can be used as the input of handover. When the mobile station 304 detects that a neighbor base station 302a-c has a better preamble signal quality than the serving base station 302d, handover to this neighbor base station 302a-c can be triggered.

Figure 5:
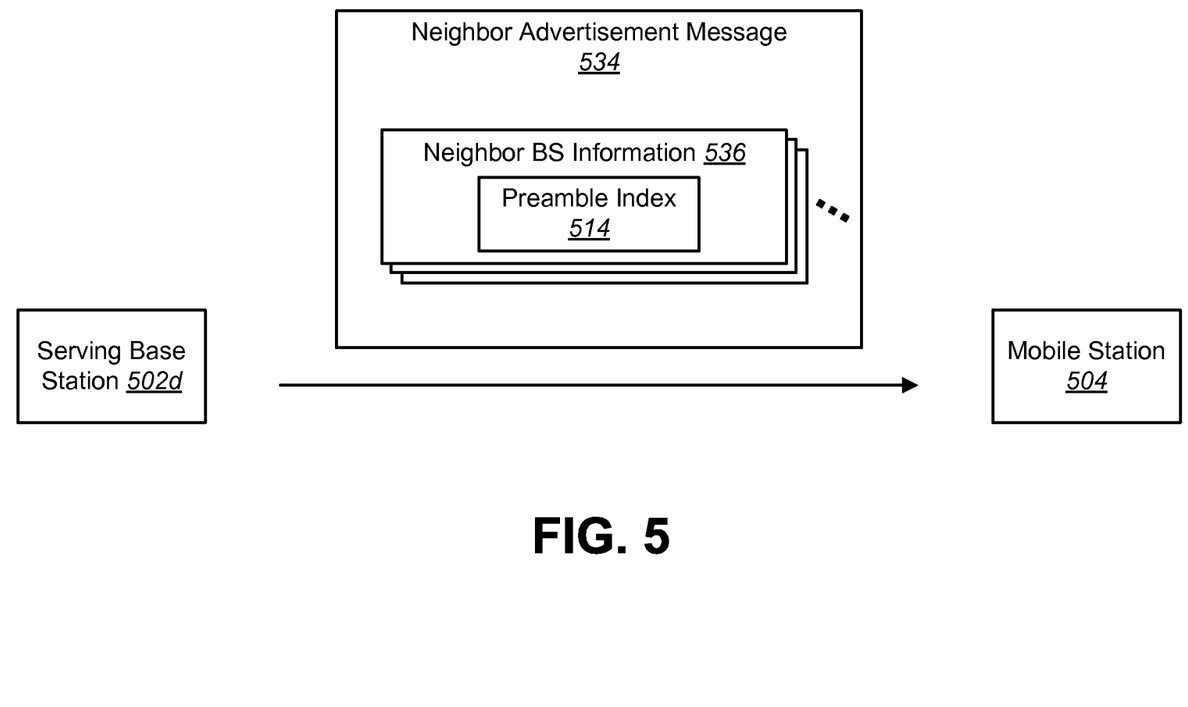
FIG. 5 illustrates a serving base station sending a neighbor advertisement message to a mobile station.

FIG. 5 illustrates a serving base station 502d sending a neighbor advertisement message 534 (e.g., MOB_NBR-ADV) to a mobile station 504. The neighbor advertisement message 534 may include information 536 about multiple neighbor base stations 302a-c. Included in the information 536 about a particular neighbor base station 502a-c is the preamble index 514 that is transmitted by the neighbor base station 502a-c.

At some point, the mobile station 504 may move to a point where one of the neighbor base stations 302a-c is providing a stronger signal to the mobile station 504 than the serving base station 502d. If this occurs, the information 536 that is included in the neighbor advertisement message 534 may allow the mobile station 504 to initiate handover from the serving base station 502d to the appropriate neighbor base station 302a-c.

Figure 6:
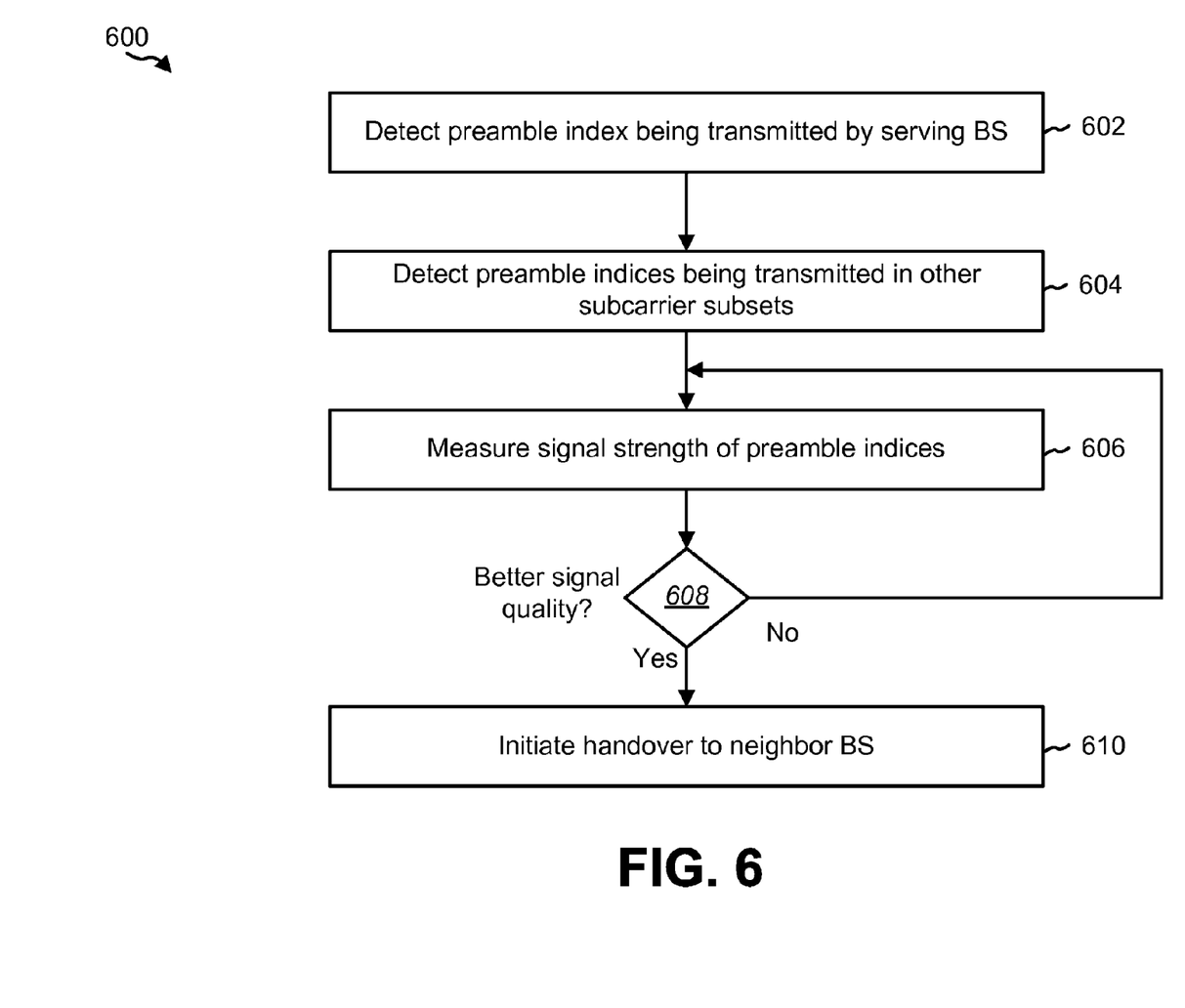
FIG. 6 illustrates a method for scanning for neighbor base station preamble indices.

FIG. 6 illustrates a method 600 for scanning for neighbor base station preamble indices 314b-d. The method 600 may be implemented by a mobile station 304.

The mobile station 304 may detect 602 the preamble index 314d that is being transmitted by the serving base station 302d. The mobile station 304 may also detect 604 the preamble indices 314a-c that are being transmitted in the other subcarrier subsets 320, i.e., the subcarrier subsets 320 other than the subcarrier subset 320 that is being used to transmit the serving base station preamble index 314d.

In the example discussed earlier, the mobile station 304 may detect preamble index A 314a and preamble index B 314b, because these preamble indices 314 are transmitted on different subcarrier subsets 320 than the serving base station preamble index 314d. The mobile station 304 may be able to detect preamble index C 314c by using another preamble index in the correlator at a different time instance, although this preamble index 314c is transmitted on the same subcarrier subset 320 as the serving base station preamble index 314d.

The mobile station 304 may also measure 606 the signal strength of the detected preamble indices 314. This may involve correlating the received subcarrier subsets 320 with the preamble indices 314, which may be known to the mobile station 304. If the mobile station 304 determines 608 that the signal quality from a neighbor base station 302a-c is greater than the signal quality of the serving base station 302d, then the mobile station 304 may initiate 610 handover to the neighbor base station 302a-c.

Figure 7:
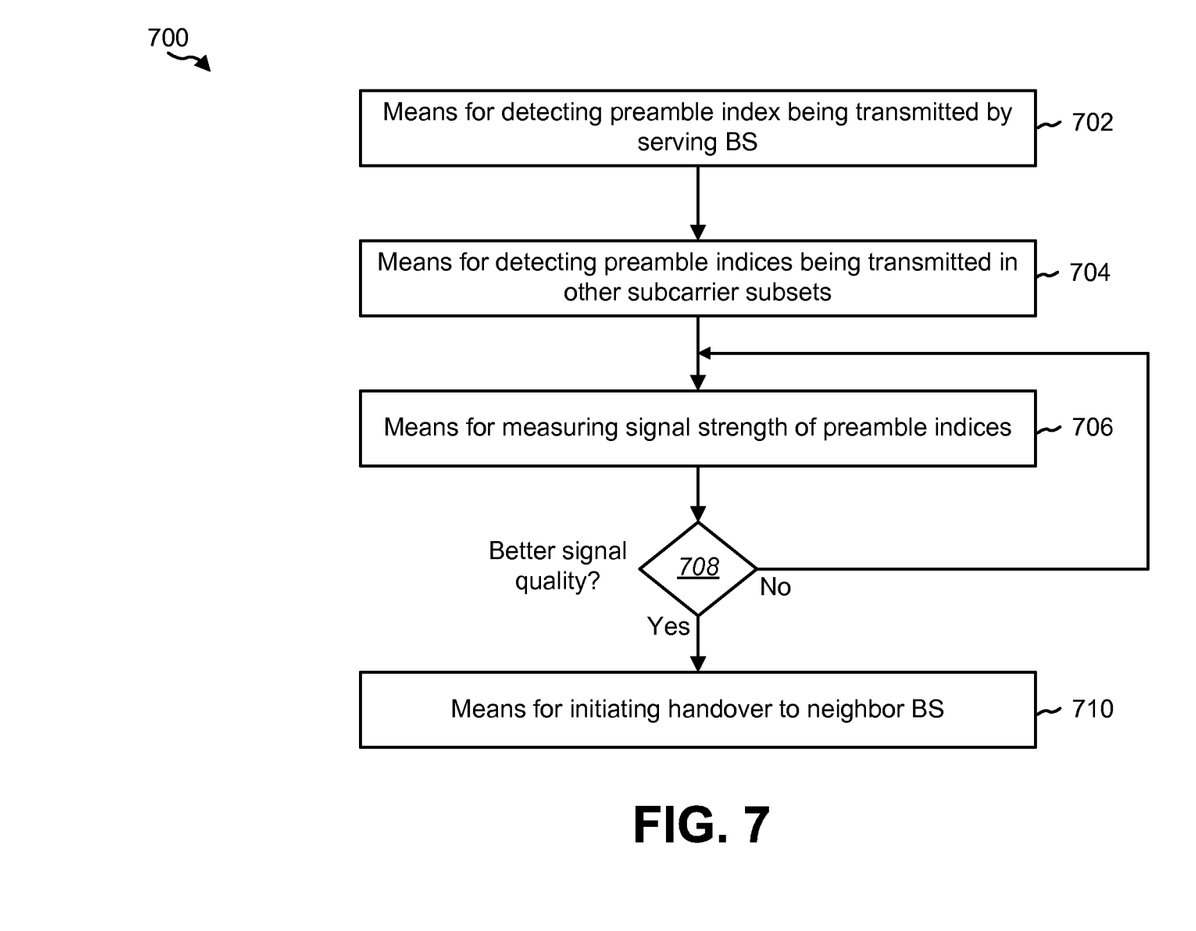
FIG. 7 illustrates means-plus-function blocks corresponding to the method of FIG. 6.

The method 600 of FIG. 6 described above may be performed by various hardware and/or software component(s) and/or module(s) corresponding to the means-plus-function blocks 700 illustrated in FIG. 7. In other words, blocks 602 through 610 illustrated in FIG. 6 correspond to means-plus-function blocks 702 through 710 illustrated in FIG. 7.

The present disclosure proposes a new approach to scan for neighbor base station preamble indices 314a-c, which may be used for purposes of initiating handover. With the techniques disclosed herein, a mobile station 304 may not have to request a special scanning duration with the current serving base station 302d in order to scan for at least some neighbor base station preamble indices 314a-c and measure the signal strength of these preamble indices 314a-c. Thus, data throughput may be maintained. With the techniques disclosed herein, the mobile station 304 can respond to channel conditions quickly for handover, as it may be possible to monitor some neighbor base station preamble indices 314a-c during every frame. The proposed scanning techniques can be used concurrently with other types of scanning, which may involve some type of time shift.

As indicated above, the techniques disclosed herein may be implemented in WiMAX systems, which are based on OFDM and OFDMA. However, the techniques disclosed herein may be used for other types of wireless communication systems, including wireless communication systems that are based on other types of orthogonal multiplexing schemes, such as Single-Carrier Frequency Division Multiple Access (SC-FDMA) systems. An SC-FDMA system may utilize interleaved FDMA (IFDMA) to transmit on subcarriers that are distributed across the system bandwidth, localized FDMA (LFDMA) to transmit on a block of adjacent subcarriers, or enhanced FDMA (EFDMA) to transmit on multiple blocks of adjacent subcarriers.

As indicated above, WiMAX standards specify that one base station 302 will use only one-third of the available subcarriers 218 (i.e., one subcarrier subset 320) to transmit its preamble index 314. Thus, there are three subcarrier subsets 320 defined for a WiMAX system. However, the techniques disclosed herein may be utilized in wireless communication systems in which a different number of subcarrier subsets 320 are defined. Where N subcarrier subsets 320 are defined in a particular wireless communication system, then the receiver 421 of a mobile station 304 may include N branches. Each of these N branches may be configured to process a given subcarrier subset 320.

Figure 8:
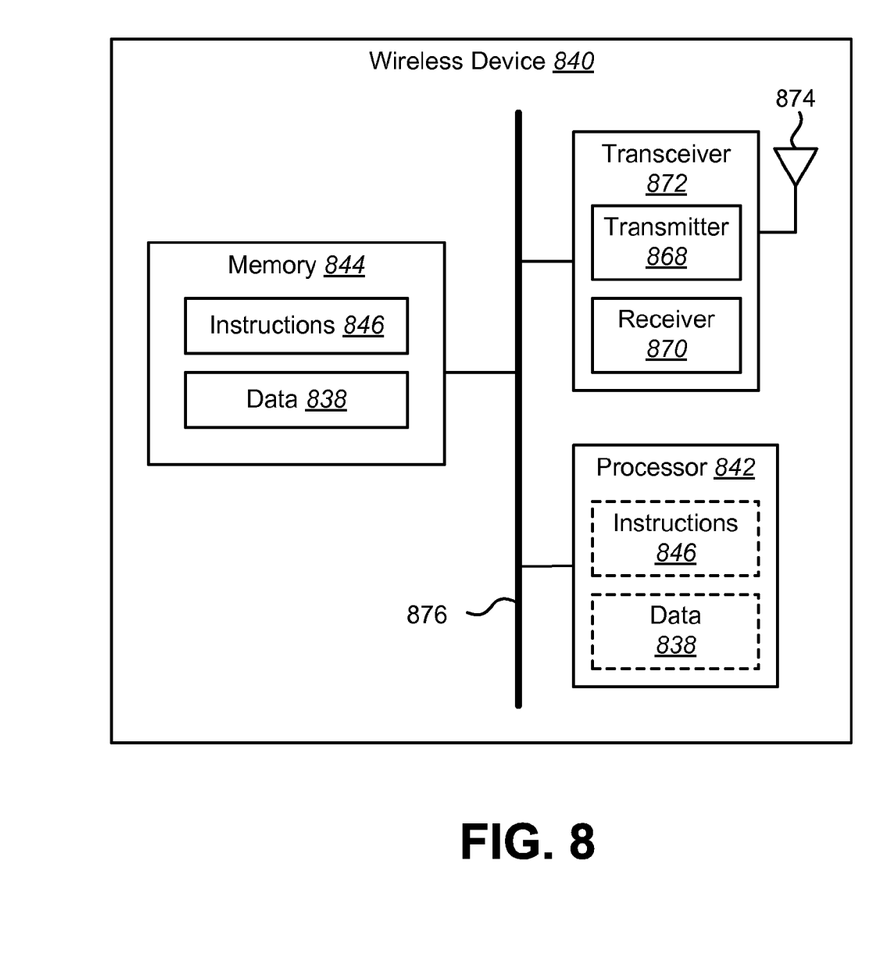
FIG. 8 illustrates certain components that may be included within a wireless device that is configured in accordance with the present disclosure.

Reference is now made to FIG. 8. FIG. 8 illustrates certain components that may be included within a wireless device 840 that is configured in accordance with the present disclosure. The wireless device 840 may be a mobile station 104 or a base station 102.

The wireless device 840 includes a processor 842. The processor 842 may be a general purpose single- or multi-chip microprocessor (e.g., an ARM), a special purpose microprocessor (e.g., a digital signal processor (DSP)), a microcontroller, a programmable gate array, etc. The processor 842 may be referred to as a central processing unit (CPU). Although just a single processor 842 is shown in the wireless device 840 of FIG. 8, in an alternative configuration, a combination of processors (e.g., an ARM and DSP) could be used.

The wireless device 840 also includes memory 844. The memory 844 may be any electronic component capable of storing electronic information. The memory 844 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 838 and instructions 846 may be stored in the memory 844. The instructions 846 may be executable by the processor 842 to implement the methods disclosed herein. Executing the instructions 846 may involve the use of the data 838 that is stored in the memory 844.

The wireless device 840 may also include a transmitter 868 and a receiver 870 to allow transmission and reception of signals between the wireless device 840 and a remote location. The transmitter 868 and receiver 870 may be collectively referred to as a transceiver 872. An antenna 874 may be electrically coupled to the transceiver 872. The wireless device 840 may also include (not shown) multiple transmitters, multiple receivers, multiple transceivers and/or multiple antenna.

The various components of the wireless device may be coupled together by one or more buses, which may include a power bus, a control signal bus, a status signal bus, a data bus, etc. For the sake of clarity, the various buses are illustrated in FIG. 8 as a bus system 876.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements. The terms "instructions" and "code" may be used interchangeably herein.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for scanning neighbor base stations in a time synchronous wireless communication system, the method implemented by a mobile station comprising:
    receiving a first unique preamble index from a base station, wherein the first unique preamble index is transmitted by the base station over one of a plurality of subcarrier subsets from the overall available subcarriers used for transmission of a first frame;
    receiving a second unique preamble index from a neighbor base station, wherein the second unique preamble index is transmitted by the neighbor base station over one of the plurality of subcarrier subsets available during transmission of a second frame, wherein the first frame and the second frame are transmitted by the base station and the neighbor base station during a same synchronous time frame;
    when the first and the second unique preamble indices are received at the same subcarrier subset, determining a signal quality measurement for each of the base station and the neighbor base station based at least in part on the first and second unique preamble indices respectively;
    when the first and the second unique preamble indices are not received at the same subcarrier subset, decoding the two subcarrier subsets for the first and the second unique preamble indices; and
    initiating handover to the neighbor base station when the signal quality measurement for the neighbor base station exceeds the signal quality measurement for the base station.

2. The method of claim 1, further comprising separately processing each subcarrier subset.

3. The method of claim 1, wherein each base station in the wireless communication system has synchronous frame timing.

4. The method of claim 1, wherein each base station in the wireless communication system transmits a unique preamble index on only one subcarrier subset out of a plurality of subcarrier subsets.

5. The method of claim 1, wherein determining the signal quality measurement for the neighbor base station comprises correlating the received second unique preamble index with a transmitted second unique preamble index and subcarrier subset that are known to the mobile station.

6. The method of claim 1, wherein determining the signal quality measurement for the g base station comprises correlating the received first unique preamble index with a transmitted first unique preamble index and subcarrier subset that are known to the mobile station.

7. The method of claim 1, wherein receiving the second unique preamble index comprises attempting to detect the second unique preamble index in available subcarrier subsets, and further comprising, upon detecting a particular second unique preamble index in a particular subcarrier subset, continuing to measure preamble signal strength using the detected second unique preamble index in a correlator on the known subcarrier subset unless a handover occurs.

8. The method of claim 1, wherein receiving the first preamble index comprises attempting to detect the first preamble index in available subcarrier subsets, and further comprising, upon detecting the first preamble index in a particular subcarrier subset, continuing to measure preamble signal strength using the detected first preamble index in a correlator on the known subcarrier subset unless a handover occurs.

9. The method of claim 1, further comprising:
   detecting a third unique preamble index that is transmitted by a second neighbor base station in a different one of the plurality of subcarrier subset than the first and second unique preamble index transmitted during the same frame; and
   using the detected third unique preamble index to determine a signal quality measurement for the second neighbor base station.

10. The method of claim 9, further comprising correlating the first unique preamble index and the third unique preamble index in a parallel manner.

11. The method of claim 1, further comprising correlating the first unique preamble index and the second unique preamble index in a sequential manner.

12. The method of claim 1, wherein the mobile station has not established a special neighbor base station scanning duration with the base station when the first unique preamble index is detected.

13. A mobile station configured for scanning neighbor base stations in a time synchronous wireless communication system, comprising:
   a processor;
   memory in electronic communication with the processor;
   instructions stored in the memory, the instructions being executable by the processor to:
      receive a first unique preamble index from a base station, wherein the first unique preamble index is transmitted by the base station over one of a plurality of subcarrier subsets from the overall available subcarriers used for transmission of a first frame;
      receive a second unique preamble index from a neighbor base station, wherein the second unique preamble index is transmitted by the neighbor base station over one of the plurality of subcarrier subsets available during transmission of a second frame, wherein the first frame and the second frame are transmitted by the base station and the neighbor base station during a same synchronous time frame;
      when the first and the second unique preamble indices are received at the same subcarrier subset, determine a signal quality measurement for each of the base station and the neighbor base station based at least in part on the first and second unique preamble indices respectively;
      when the first and the second unique preamble indices are not received at the same subcarrier subset, decode the two subcarrier subsets for the first and the second unique preamble indices; and
      initiate handover to the neighbor base station when the signal quality measurement for the neighbor base station exceeds the signal quality measurement for the base station.

14. The mobile station of claim 13, wherein the instructions are also executable to separately process each subcarrier subset.

15. The mobile station of claim 13, wherein each base station in the wireless communication system has synchronous frame timing.

16. The mobile station of claim 13, wherein each base station in the wireless communication system transmits a unique preamble index on only one subcarrier subset out of a plurality of subcarrier subsets.

17. The mobile station of claim 13, wherein determining the signal quality measurement for the neighbor base station comprises correlating the received second unique preamble index with a transmitted second unique preamble index and subcarrier subset that are known to the mobile station.

18. The mobile station of claim 13, wherein determining the signal quality measurement for the base station comprises correlating the received first preamble index with a transmitted serving base station preamble index and subcarrier subset that are known to the mobile station.

19. The mobile station of claim 13, wherein receiving the second unique preamble index comprises attempting to detect the second unique preamble index in the available subcarrier subsets, and wherein the instructions are also executable to, upon detecting a particular second unique preamble index in a particular subcarrier subset, continue to measure preamble signal strength using the detected second unique preamble index in a correlator on the known subcarrier subset unless a handover occurs.

20. The mobile station of claim 13, wherein receiving the first preamble index comprises attempting to detect the first unique preamble index in the available subcarrier subsets, and wherein the instructions are also executable to, upon detecting the first unique preamble index in a particular subcarrier subset, continue to measure preamble signal strength using the detected first unique preamble index in a correlator on the known subcarrier subset unless a handover occurs.

21. The mobile station of claim 13, wherein the mobile station has not established a special neighbor base station scanning duration with the base station when the first unique preamble index is detected.

22. A mobile station configured for scanning neighbor base stations in a time synchronous wireless communication system, comprising:
   means for receiving a first unique preamble index from a base station, wherein the first unique preamble index is transmitted by the base station over one of a plurality of subcarrier subsets from the overall available subcarriers used for transmission of a first frame;
   means for receiving a second unique preamble index from a neighbor base station, wherein the second unique preamble index is transmitted by the neighbor base station over one of the plurality of subcarrier subsets available during transmission of a second frame, wherein the first frame and the second frame are transmitted by the base station and the neighbor base station during a same synchronous time frame;

when the first and the second unique preamble indices are received at the same subcarrier subset, means for determining a signal quality measurement for each of the base station and the neighbor base station based at least in part on the first and second unique preamble indices respectively;

when the first and the second unique preamble indices are not received at the same subcarrier subset, means for decoding the two subcarrier subsets for the first and the second unique preamble indices; and means for initiating handover to the neighbor base station when the signal quality measurement for the neighbor base station exceeds the signal quality measurement for the base station.

23. The mobile station of claim 22, further comprising means for separately processing each subcarrier subset.

24. The mobile station of claim 22, wherein each base station in the wireless communication system has synchronous frame timing.

25. The mobile station of claim 22, wherein each base station in the wireless communication system transmits a unique preamble index on only one subcarrier subset out of a plurality of subcarrier subsets.

26. The mobile station of claim 22, wherein the means for determining the signal quality measurement for the neighbor base station comprises means for correlating the received second unique preamble index with a transmitted second unique preamble index and subcarrier subset that are known to the mobile station.

27. The mobile station of claim 22, wherein the means for determining the signal quality measurement for the base station comprises means for correlating the received first unique preamble index with a transmitted unique preamble index and subcarrier subset that are known to the mobile station.

28. The mobile station of claim 22, wherein the means for receiving the second unique preamble index comprises means for attempting to detect the second unique preamble index in the available subcarrier subsets, and further comprising means for, upon detecting a particular second unique preamble index in a particular subcarrier subset, continuing to measure preamble signal strength using the detected second unique preamble index in a correlator on the known subcarrier subset unless a handover occurs.

29. The mobile station of claim 22, wherein the means for receiving the first unique preamble index comprises means for attempting to detect the first unique preamble index in available subcarrier subsets, and further comprising means for, upon detecting the first unique preamble index in a particular subcarrier subset, continuing to measure preamble signal strength using the detected first unique preamble index in a correlator on the known subcarrier subset unless a handover occurs.

30. The mobile station of claim 22, wherein the mobile station has not established a special neighbor base station scanning duration with the base station when the first unique preamble index is detected.

31. A non-transitory computer-readable medium embodied with computer executable code for scanning neighbor base stations in a time synchronous wireless communication system by a mobile station, the instructions comprising:

code for receiving a first unique preamble index from a base station, wherein the first unique preamble index is transmitted by the base station over one of a plurality of subcarrier subsets from the overall available subcarriers used for transmission of a first frame;

code for receiving a second unique preamble index from a neighbor base station, wherein the second unique preamble index is transmitted by the neighbor base station over one of the plurality of subcarrier subsets available during transmission of a second frame, wherein the first frame and the second frame are received during a same synchronous time frame;

when the first and the second unique preamble indices are received at the same subcarrier subset, code for determining a signal quality measurement for each of the base station and the neighbor base station based at least in part on the first and second unique preamble indices respectively;

when the first and the second unique preamble indices are not received at the same subcarrier subset, code for decoding the two subcarrier subsets for the first and the second unique preamble; and code for initiating handover to the neighbor base station when the signal quality measurement for the neighbor base station exceeds the signal quality measurement for the base station.

32. The non-transitory computer-readable medium of claim 31, wherein the mobile station has not established a special neighbor base station scanning duration with the base station when the first unique preamble index is detected.

* * * * *